US011976615B1

(12) United States Patent
Suzuki et al.

(10) Patent No.: US 11,976,615 B1
(45) Date of Patent: May 7, 2024

(54) FUEL SUPPLYING DEVICE FOR INTERNAL COMBUSTION ENGINE

(71) Applicant: TOYOTA JIDOSHA KABUSHIKI KAISHA, Aichi-ken (JP)

(72) Inventors: Yuki Suzuki, Kariya (JP); Tomihisa Tsuchiya, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/533,171

(22) Filed: Dec. 8, 2023

(30) Foreign Application Priority Data

Jan. 10, 2023 (JP) .................................. 2023-001698

(51) Int. Cl.
*F02M 21/02* (2006.01)
*F02M 25/028* (2006.01)

(52) U.S. Cl.
CPC .... *F02M 21/0275* (2013.01); *F02M 21/0221* (2013.01); *F02M 21/0239* (2013.01); *F02M 25/028* (2013.01)

(58) Field of Classification Search
CPC ............. F02M 25/028; F02M 21/0239; F02M 21/0221; F02M 21/0275
See application file for complete search history.

(56) References Cited

U.S. PATENT DOCUMENTS

| 6,718,956 B2 * | 4/2004 | Klipfel .................. | F28D 7/1669 |
| | | | 123/568.12 |
| 2006/0151891 A1 * | 7/2006 | Meyer .................. | F02M 31/093 |
| | | | 261/DIG. 12 |
| 2023/0184180 A1 * | 6/2023 | Svensson ............ | F02D 19/0665 |
| | | | 123/445 |

FOREIGN PATENT DOCUMENTS

| EP | 1316688 A2 * | 6/2003 | ......... F01N 13/0097 |
| JP | 2018131947 A | 8/2018 | |

* cited by examiner

*Primary Examiner* — Kevin A Lathers

(57) ABSTRACT

A fuel supplying device for an internal combustion engine includes a tank configured to store a gaseous fuel, a fuel injection valve configured to supply the gaseous fuel to a cylinder of the internal combustion engine, a fuel passage configured to supply the gaseous fuel in the tank to the fuel injection valve, and a pressure reduction valve provided in the fuel passage. The fuel passage has a double-walled pipe structure including an inner pipe through which the gaseous fuel flows and an outer pipe that has an inner diameter larger than the inner pipe and covers the inner pipe. The fuel passage is configured such that a coolant is supplied to a space between the outer pipe and the inner pipe.

4 Claims, 2 Drawing Sheets

FUEL SUPPLYING DEVICE FOR INTERNAL COMBUSTION ENGINE

BACKGROUND

1. Field

The present disclosure relates to a fuel supplying device for an internal combustion engine.

2. Description of Related Art

For example, Japanese Laid-Open Patent Publication No. 2018-131947 discloses a fuel supplying device for an internal combustion engine that includes a pressure reduction valve for reducing the pressure of gaseous fuel in a tank. The pressure reduction valve includes a heat exchange chamber for heat exchange with coolant. Heat is exchanged between the coolant and the pressure reduction valve.

The temperature of gaseous fuel flowing through a fuel passage varies due to various factors. Compared to liquid fuel, gaseous fuel has greater changes in density and pressure loss in the flow passage due to temperature changes. Therefore, if the temperature of gaseous fuel varies, the amount of fuel injected from the fuel injection valve will vary, which may lead to a deterioration in the precision of the fuel injection amount.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel supplying device for an internal combustion engine includes a tank configured to store a gaseous fuel, a fuel injection valve configured to supply the gaseous fuel to a cylinder of the internal combustion engine, a fuel passage configured to supply the gaseous fuel in the tank to the fuel injection valve, and a pressure reduction valve provided in the fuel passage. The fuel passage has a double-walled pipe structure including an inner pipe through which the gaseous fuel flows and an outer pipe that has an inner diameter larger than the inner pipe and covers the inner pipe. The fuel passage is configured such that a coolant is supplied to a space between the outer pipe and the inner pipe.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a fuel supplying device for an internal combustion engine according to an embodiment will be described with reference to FIGS. 1 to 3.

Fuel Supplying Device for Internal Combustion Engine and Surroundings

Figure 1:
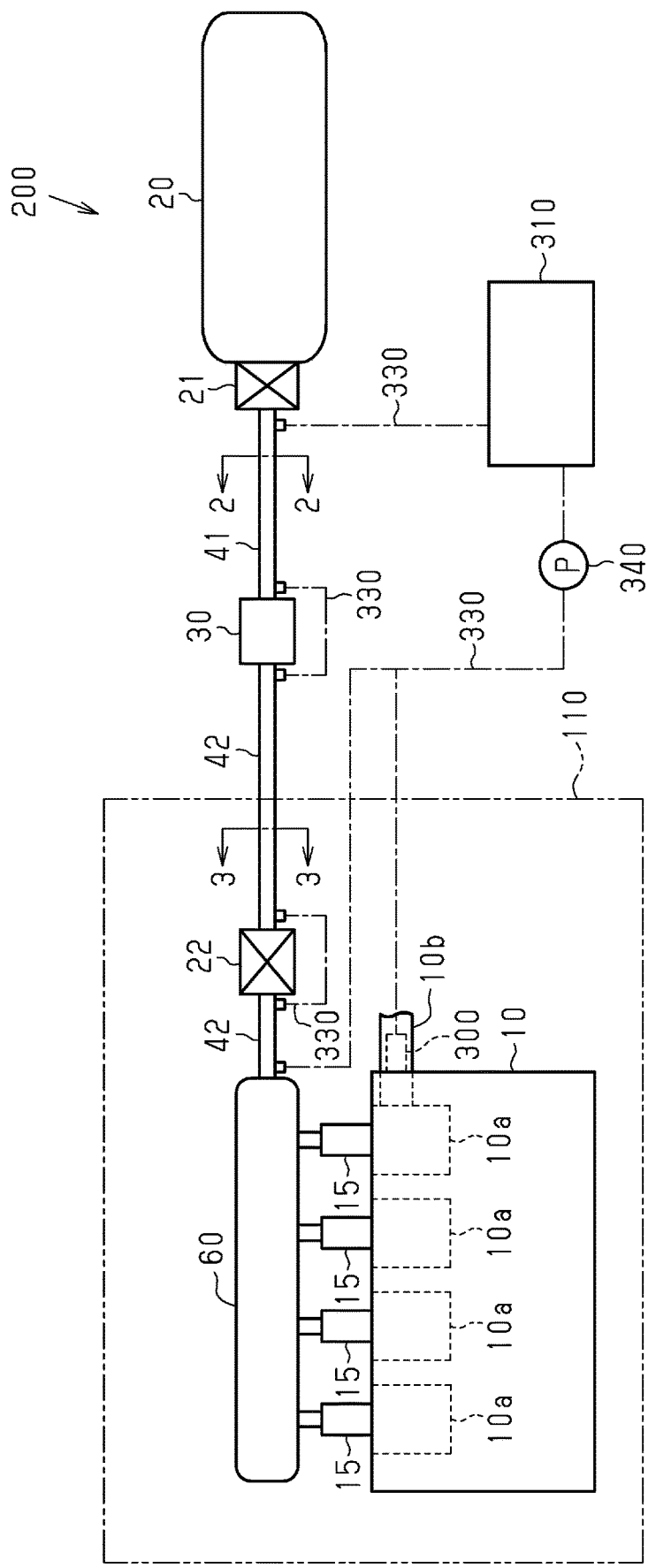
FIG. 1 is a schematic diagram showing a fuel supplying device and its surroundings in an internal combustion engine according to one embodiment.

The internal combustion engine 10 shown in FIG. 1 uses hydrogen gas, which is gaseous fuel, as fuel.

The fuel supplying device 200 included in the internal combustion engine 10 includes a plurality of fuel injection valves 15, a tank 20, a fuel passage, a first shut-off valve 21, a second shut-off valve 22, and a pressure reduction valve 30. The fuel passage includes a first fuel passage 41, a second fuel passage 42, and a delivery pipe 60.

Each of the fuel injection valves 15 supplies fuel to a corresponding one of the cylinders 10a of the internal combustion engine 10.

The tank 20 stores hydrogen gas as a gaseous fuel in a compressed state.

The fuel injection valve 15 is connected to the delivery pipe 60.

The hydrogen gas stored in the tank 20 is supplied to each fuel injection valve 15 via the first fuel passage 41, the second fuel passage 42, and the delivery pipe 60.

The first shut-off valve 21 is an electromagnetic valve and is disposed in the vicinity of the outlet of the tank 20. When the first shut-off valve 21 is open, fuel supply from the tank 20 to the first fuel passage 41 is allowed. When the first shut-off valve 21 is closed, fuel supply from the tank 20 to the first fuel passage 41 is stopped.

The pressure reduction valve 30 is an electromagnetic valve, and adjusts the pressure of the hydrogen gas supplied to each fuel injection valve 15 to a pressure corresponding to the operating state of the internal combustion engine 10.

The second shut-off valve 22 is an electromagnetic valve and is disposed in the vicinity of the delivery pipe 60. When the second shut-off valve 22 is open, fuel is allowed to be supplied from the second fuel passage 42 to the delivery pipe 60. When the second shut-off valve 22 is closed, the supply of fuel from the second fuel passage 42 to the delivery pipe 60 is stopped. The second shut-off valve 22 is disposed in the engine compartment 110.

The first shut-off valve 21 and the second shut-off valve 22 are maintained in the closed state during the operation stop of the internal combustion engine 10. The first shut-off valve 21 and the second shut-off valve 22 are maintained in an open state during the operation of the internal combustion engine 10.

The first shut-off valve 21 and the pressure reduction valve 30 are connected to each other by the first fuel passage 41. The first fuel passage 41 supplies the gaseous fuel from the tank 20 to the pressure reduction valve 30.

The pressure reduction valve 30 and the delivery pipe 60 are connected to each other by the second fuel passage 42. The second fuel passage 42 supplies the gaseous fuel from the pressure reduction valve 30 to the fuel injection valve 15. A portion of the second fuel passage 42 is disposed in the engine compartment 110. The second shut-off valve 22 is provided in the second fuel passage 42.

The internal combustion engine 10 includes an intake passage 10b connected to the cylinders 10a. The intake passage 10b is provided with at least one water injection valve 300. The water injection valve 300 is connected to a water tank 310 via a water pipe 330 having a pump 340. The water tank 310 stores water to be injected into the intake passage 10b by the water injection valve 300. The water injection valve 300 may be provided corresponding to each of the cylinders 10a. Each of the water injection valves 300 may inject water into an intake port, which is a part of the intake passage 10b, connected to the corresponding one of the cylinders 10a.

Structure of Fuel Passage

Figure 2:
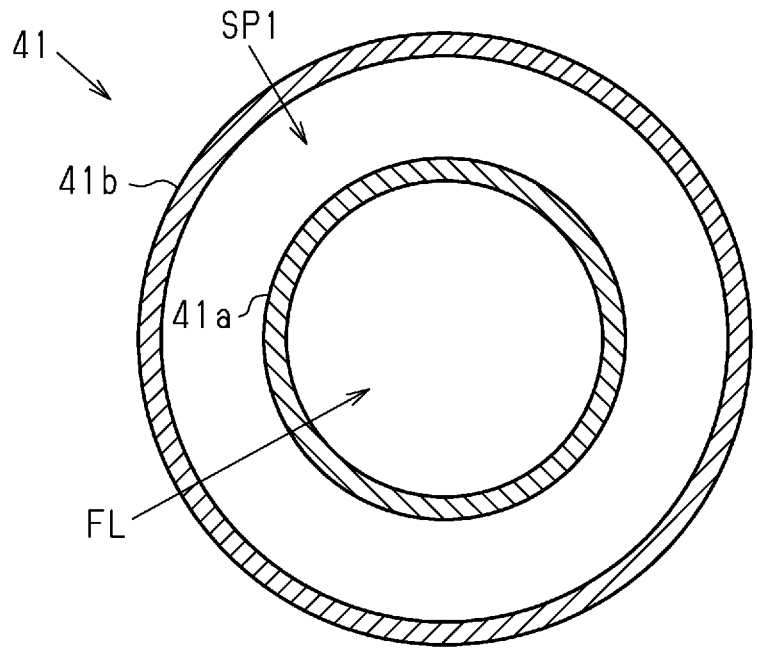
FIG. 2 is a cross-sectional view taken along line 2-2 in FIG. 1, illustrating a first fuel passage.

FIG. 2 shows a cross section in the radial direction of the first fuel passage 41. The first fuel passage 41 has a double-walled pipe structure including an inner pipe 41a and an outer pipe 41b. The outer pipe 41b has an inner diameter larger than the inner pipe 41a and covers the entire outer circumference of the inner pipe 41a. In the present embodiment, the entire first fuel passage 41 has a double-walled pipe structure.

Gaseous fuel FL, which is fuel for the internal combustion engine 10, flows through the inner pipe 41a. Coolant is supplied to a space SP1 between the outer pipe 41b and the inner pipe 41a. The coolant is water stored in the water tank 310. The above-described water pipe 330 is connected to the outer pipe 41b, and water is circulated between the water tank 310 and the space SP1.

Figure 3:
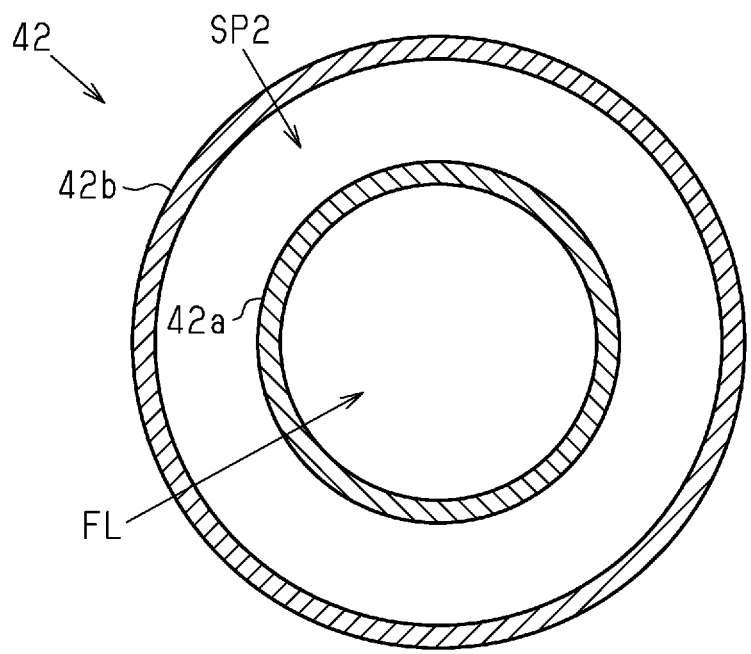
FIG. 3 is a cross-sectional view taken along line 3-3 in FIG. 1, illustrating a second fuel passage.

FIG. 3 shows a cross section in the radial direction of the second fuel passage 42. The second fuel passage 42 has a double-walled pipe structure including an inner pipe 42a and an outer pipe 42b. The outer pipe 42b has an inner diameter larger than the inner pipe 42a and covers the entire outer circumference of the inner pipe 42a. In the present embodiment, the entire second fuel passage 42 has a double-walled pipe structure.

The gaseous fuel FL, which is fuel for the internal combustion engine 10, flows through the inner pipe 42a. Coolant is supplied to a space SP2 between the outer pipe 42b and the inner pipe 42a. The coolant is water stored in the water tank 310. The above-described water pipe 330 is connected to the outer pipe 42b, and water is circulated between the water tank 310 and the space SP2.

Operation and Advantages

An operation and advantages of the present embodiment will now be described.

(1) When the gaseous fuel in the tank 20 is consumed and the internal pressure of the tank 20 decreases, the temperature of the gaseous fuel supplied from the tank 20 to the pressure reduction valve 30 decreases due to adiabatic expansion. The degree of decrease in the temperature varies depending on the internal pressure of the tank 20. Therefore, the temperature of the gaseous fuel may vary depending on the internal pressure of the tank 20.

In this regard, in the present embodiment, the first fuel passage 41, which supplies gaseous fuel from the tank 20 to the pressure reduction valve 30, has a double-walled pipe structure. Heat exchange is thus performed between the gaseous fuel flowing through the inner pipe 41a and the coolant flowing through the outer pipe 41b, so that the temperature of the gaseous fuel approaches the temperature of the coolant. This suppresses the temperature variation of the gaseous fuel flowing through the first fuel passage 41. Therefore, it is possible to prevent the precision of the fuel injection amount of the fuel injection valve 15 from deteriorating due to the temperature variation of the gaseous fuel.

(2) The second fuel passage 42 that supplies the gaseous fuel to the fuel injection valve 15 is partially disposed in the engine compartment 110. Therefore, the gaseous fuel flowing through the second fuel passage 42 is likely to be affected by heat from the internal combustion engine 10. Therefore, the temperature of the gaseous fuel may vary depending on the temperature of the internal combustion engine 10.

In this regard, in the present embodiment, the second fuel passage 42, has a double-walled pipe structure. Heat exchange is thus performed between the gaseous fuel flowing through the inner pipe 42a and the coolant flowing through the outer pipe 42b, so that the temperature of the gaseous fuel approaches the temperature of the coolant. This suppresses the temperature variation of the gaseous fuel flowing through the second fuel passage 42. Therefore, it is possible to prevent the precision of the fuel injection amount of the fuel injection valve 15 from deteriorating due to the temperature variation of the gaseous fuel.

Modifications

The above-described embodiment may be modified as follows. The above-described embodiment and the following modifications can be combined if the combined modifications remain technically consistent with each other.

Only one of the first fuel passage 41 and the second fuel passage 42 may have the above-described double-walled pipe structure.

The first fuel passage 41 may partially have the above-described double-walled pipe structure.

In the second fuel passage 42, only a portion disposed in the engine compartment 110 may have the above-described double-walled pipe structure.

The coolant supplied between the outer pipe and the inner pipe may be a coolant other than water stored in the water tank 310, for example, cooling water for cooling the internal combustion engine 10.

The gaseous fuel supplied from the tank 20 to the cylinders 10a may be a gaseous fuel other than hydrogen gas, for example, compressed natural gas.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel supplying device for an internal combustion engine, the device comprising:
   a tank configured to store a gaseous fuel;
   a fuel injection valve configured to supply the gaseous fuel to a cylinder of the internal combustion engine;
   a fuel passage configured to supply the gaseous fuel in the tank to the fuel injection valve; and
   a pressure reduction valve provided in the fuel passage, wherein
   the fuel passage has a double-walled pipe structure including an inner pipe through which the gaseous fuel flows and an outer pipe that has an inner diameter larger than the inner pipe and covers the inner pipe, and
   the fuel passage is configured such that a coolant is supplied to a space between the outer pipe and the inner pipe.

2. The fuel supplying device according to claim 1, wherein
   the fuel passage includes a first fuel passage configured to supply the gaseous fuel from the tank to the pressure reduction valve, and
   the first fuel passage has the double-walled pipe structure.

3. The fuel supplying device according to claim 1, wherein
   the fuel passage includes a second fuel passage configured to supply the gaseous fuel from the pressure reduction valve to the fuel injection valve, and
   the second fuel passage has the double-walled pipe structure.

4. The fuel supplying device according to claim 1, wherein
   the internal combustion engine includes an intake passage connected to the cylinder, and a water tank configured to store water to be injected into the intake passage, and
   the coolant is water stored in the water tank.

\* \* \* \* \*